United States Patent [19]
Campbell et al.

[11] 3,831,964
[45] Aug. 27, 1974

[54] SWIVEL ASSEMBLY FOR STEERABLE AXLE

[75] Inventors: Roger W. Campbell, Melbourne, Ontario; Edvards B. Aukmanis; Milan Placko, both of London, Ontario, all of Canada

[73] Assignee: General Motors Corporation, Detroit, Mich.

[22] Filed: Sept. 12, 1973

[21] Appl. No.: 396,573

[52] U.S. Cl. ............................ 280/81 A, 180/24.01
[51] Int. Cl. ............................................ B62d 13/02
[58] Field of Search ......... 180/24.01, 24.06, 79.2 C, 180/79.2 R, 79.5; 280/81 A, 81 R, 104.5 R, 104.5 A, 104.5 B

[56] References Cited
UNITED STATES PATENTS
2,954,985  10/1960  Drong ........................ 180/24.01 X
3,051,506  8/1962  Stump ........................... 280/81 A
3,149,858  9/1964  Gilbert ..................... 280/104.5 R X Primary Examiner—David Schonberg
Assistant Examiner—Terrance L. Siemens
Attorney, Agent, or Firm—Edward J. Biskup

[57] ABSTRACT

A swivel assembly for connecting a transverse axle member to a vehicle frame member and adapted to be located in a slot formed in one of the members to allow the axle member to be steerable about a vertical steer axis and to oscillate about a horzontal axis. The swivel assembly includes a cushioning device having a plurality of resilient pad members for absorbing side loads on the vehicle.

4 Claims, 12 Drawing Figures

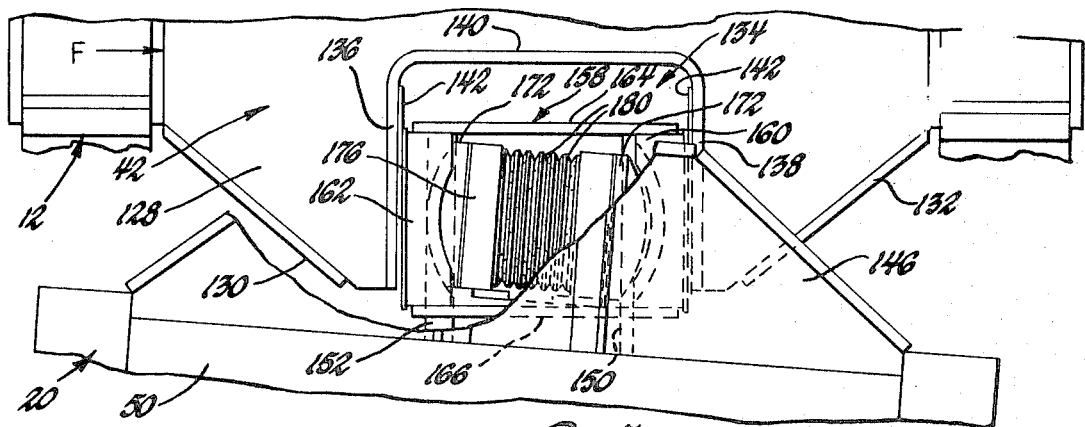
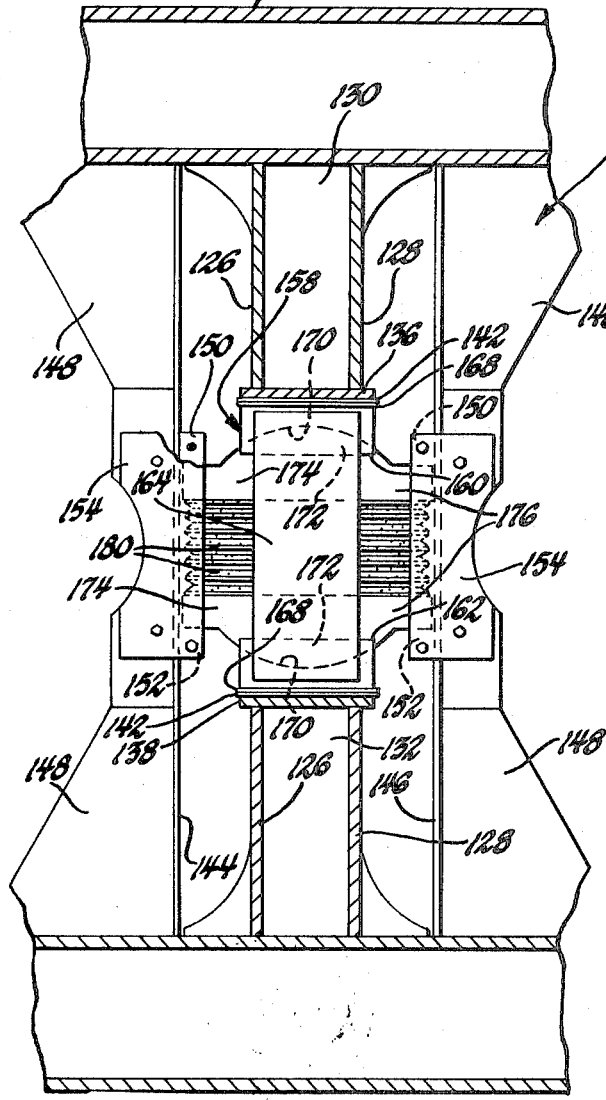
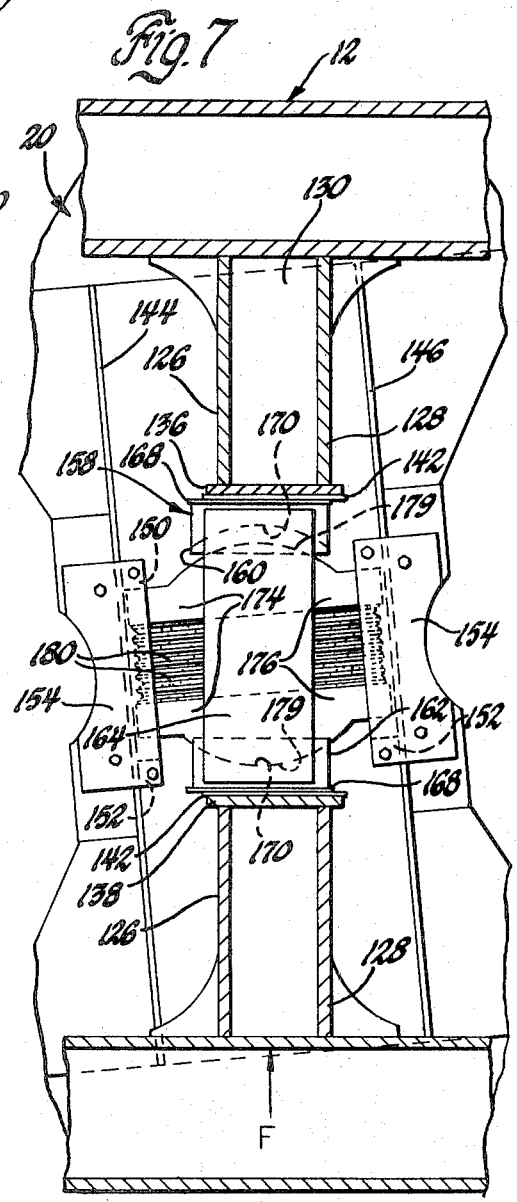

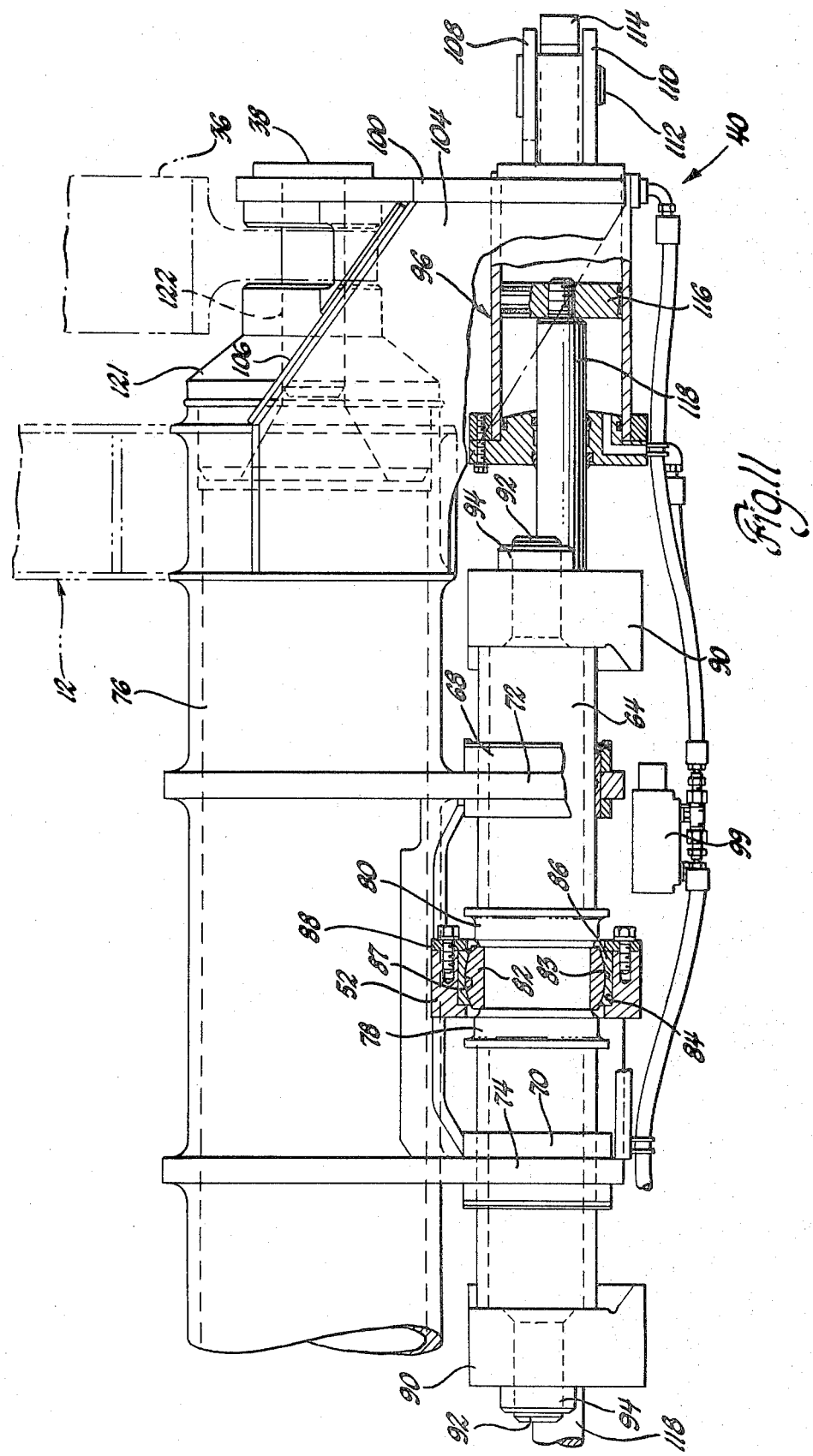

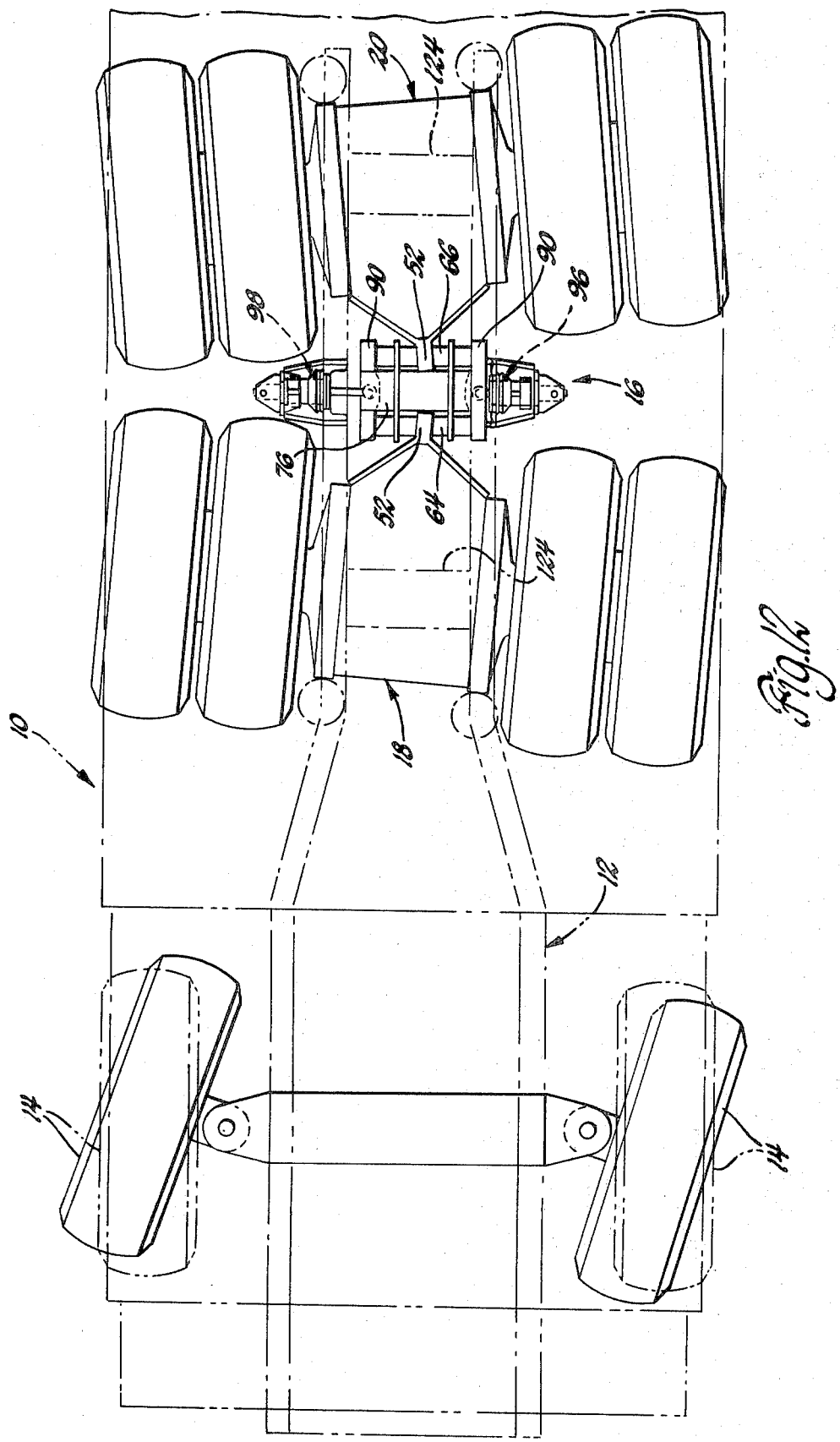

SWIVEL ASSEMBLY FOR STEERABLE AXLE

As is well known, all six-wheeled vehicles experience a certain amount of lateral slippage or tire scuffing when curves are being negotiated. This occurs because when two of the axles of a vehicle are held in rigid parallelism, the rotational axes of all the wheels cannot possibly pass through a single point or a vertical line, and therefore, when corners are being turned some of the wheels necessarily must slip sideways. In the past, this slippage has been reduced somewhat by designing the axle arrangement so that the rear axles are not held rigidly parallel. This was done by having the axles connected by springs to the vehicle frame so that on curves, the centrifugal force action on the spring-supported mass transferred the load from the inner to the outer spring. Depending upon the curvature of the springs, this caused a shortening of the inner spring and lengthening of the outer spring with the result that the axles moved out of parallelism in such a way as to improve the steering conditions and reduce the scuffing action.

This invention concerns a six-wheeled vehicle of the type described above and is particularly directed to a tandem rear axle arrangement that includes swivel assemblies that allow steering movement of the axles in response to steering movement of the front wheels. Thus, rather than relying on springs lengthening and shortening as a result of centrifugal force for providing steering movement of the rear axles, the present invention permits positive steering to occur through the use of power-operated hydraulic cylinders which are connected to the rear axles and cause the latter to be simultaneously rotated about longitudinally spaced vertical axes so as to minimize slippage and tire scuffing as the vehicle corners.

More specifically, the present invention contemplates a swivel assembly that connects each of the axles to a portion of the vehicle frame. In the preferred form, the swivel assembly is adapted to be located in a U-shaped slot formed in the frame that is defined by a pair of laterally spaced and parallel end walls located in vertical planes which extend longitudinally of the frame. A cushioning device forms a part of the swivel assembly and includes a housing having a pair of laterally spaced and rigidly interconnected end block members. The end block members are formed with outer walls which are adapted to maintain surface-to-surface contact with the slot end walls so as to allow the housing to move along mutually perpendicular axes relative to the side walls, Each end block member has a spherical bearing surface formed therein that supports a bearing member carried by the axle and a plurality of resilient pad members are located between the bearing members for urging each bearing member into engagement with the bearing surface on the associated end block member.

The objects of the present invention are to provide a swivel assembly that connects an axle to a vehicle frame and serves as a ball and socket connection that allows the axle to be steered about a vertical axis and oscillate about a pair of horizontal axes which are perpendicular to each other; to provide a swivel assembly for steerable tandem axles that connects each axle to the vehicle frame and allows power-operated means to simultaneously rotate the axles in opposite directions about vertical steer axes passing through the swivel assemblies; to provide a swivel assembly that permits an axle to be steerable about a vertical axis and includes cushioning means that absorbs limited lateral movement of the vehicle frame relative to the axle; to provide a swivel assembly that serves as a vertical pivot about which a transverse axle member having wheels at the opposite ends can be steered while allowing vertical and oscillatory movement of the axle member; and to provide a lateral stabilizer for a transverse axle having rotatable wheels at the opposite ends thereof that includes means for allowing steering movement of the axle about a vertical steer axis.

Other objects and advantages of the present invention will be apparent from the following detailed description when taken with the drawings in which:

FIG. 5 is a view similar to FIG. 4 but shows the axle tilted about the longitudinal axis of the vehicle;

FIG. 6 is a plan view taken on lines 6—6 of FIG. 4;

FIG. 7 is a view similar to FIG. 6 but shows the axle with lateral forces acting thereon and rotated about the vertical steer axis which passes through the swivel assembly;

FIG. 11 is a side elevational view of the steering actuator taken on lines 11—11 of FIG. 10, and FIG. 12 is a plan view schematically showing the vehicle of FIG. 1 with the wheels thereof in a turned position.

Figure 1:
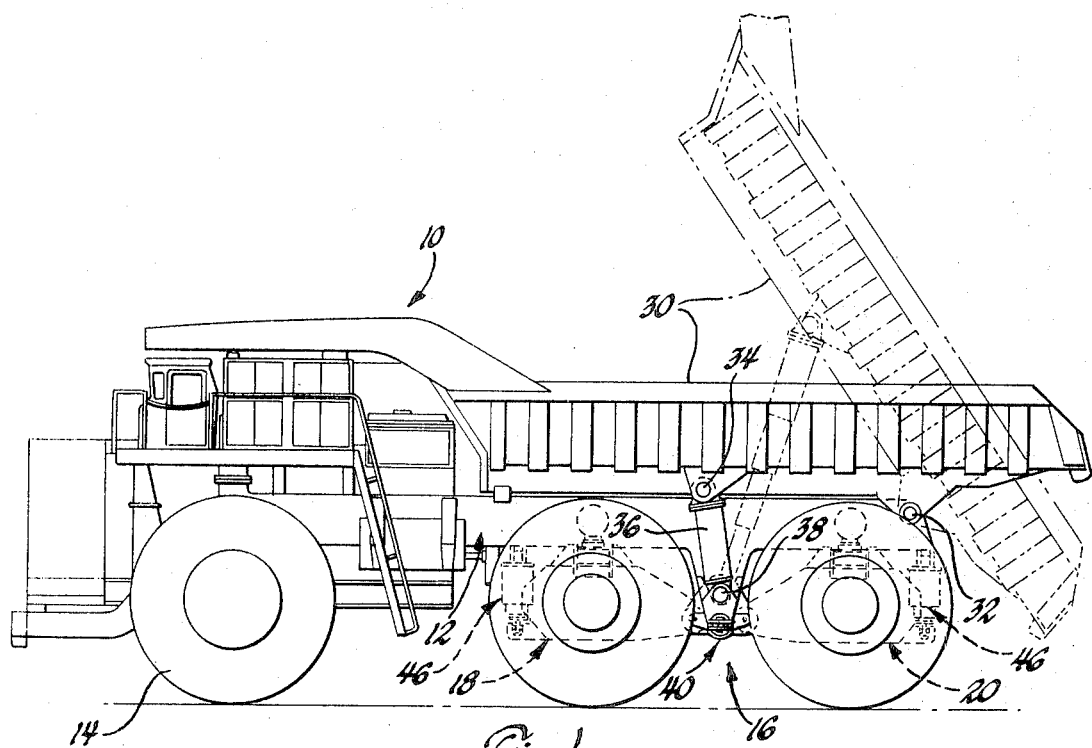
FIG. 1 is an elevational view showing a six-wheeled vehicle having tandem rear axles each of which is steerable about a swivel assembly made according to the invention.
Figure 2:
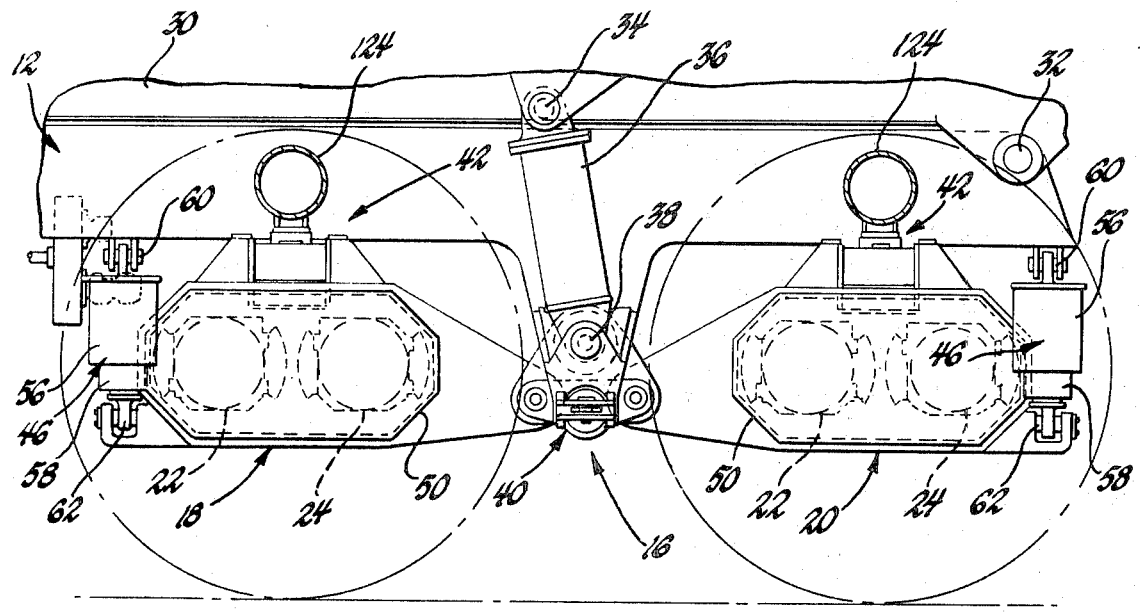
FIG. 2 is an enlarged view showing the steerable tandem axle arrangement shown in FIG. 1.

Referring to the drawings and more specifically FIGS. 1, 2 and 12 thereof, an off-highway six-wheeled rear dump vehicle 10 is shown comprising, in general, a vehicle frame 12 the forward end of which supports a pair of dirigible front wheels 14. The frame 12 is formed as a rigid full box section with side rails interconnected by torque tube stiffeners and has the rear portion thereof supported by a steerable tandem axle suspension 16 which includes a pair of longitudinally spaced rear axles 18 and 20 each of which is provided with dual tires at the opposite ends thereof. The vehicle 10 is electrically powered by a diesel-generator set supported by the frame 12 above the front wheels 14 that serves to supply electricity to a pair of series wound traction motors 22 and 24 supported within each of the rear axles 18 and 20. The respective traction motors 22 and 24 are connected through suitable gearing not shown to final drive and wheel assemblies 26 and 28, seen in FIG. 3, which transmit driving torque to the dual tires at the opposite end of each axle.

A material-handling chute-type body 30 is carried by the frame 12 above the rear axles 18 and 20 and has the rear end thereof connected by laterally spaced pins 32 to the frame 12 for pivotal movement about a transverse horizontal axis. An intermediate portion of the body 30 outboard of each side rail of the frame 12 is connected by a pivotal connection 34 to one end of a multistage double-acting inverted hydraulic hoist 36 the other end of which is connected by a pivotal connection 38 to the vehicle frame 12 between axles 18 and 20. Thus, by expanding the multistage hoist 36, the body 30 is moved about the pins 32 to the phantom-line position shown in FIG. 1 for dumping a load.

More specifically and as seen in FIG. 2, the steerable tandem axle suspension 16 comprises the rear axles 18 and 20, a steering actuator 40, a pair of identical swivel assemblies 42, made according to the invention, and two pair of transversely spaced ride cylinders 46 and 48. The rear axles 18 and 20 are supported by the frame 12 and connected to the steering actuator 40 so when the vehicle 10 is negotiating a curve, the rear axles 18 and 20 are simultaneously positively moved about longitudinally spaced vertical axes into steered positions so as to minimize wheel slippage and tire scuffing that normally occurs in six-wheeled vehicles.

Both rear axles 18 and 20 are identical in construction and each includes a housing 50 which has an enlarged central portion for supporting the traction motors 22 and 24 referred to above. The housing 50 has one end thereof integrally formed with an arm 52 that projects towards the steering actuator 40 and is supported thereby in a manner to be described hereinafter. The other end of each housing 50 is formed with a pair of outwardly projecting ears 54 and 55 which respectively serve as connecting points for the lower ends of the ride cylinders 46 and 48.

As best seen in FIG. 2, each ride cylinder 46 and 48 consists of a pair of relatively movable cylindrical housing members 56 and 58 between which a plurality of resilient rubber pad members are provided for cushioning oscillatory movement of the associated axle. The housing members 56 and 58 of each ride cylinder 46 and 48 are respectively mounted to the frame 12 and the axle through spherical pivotal connections 60 and 62 which include pins that extend along axes that are parallel to the longitudinal axis of the vehicle. As seen, each axle housing 50 midway between the associated wheels is connected by the swivel assembly 42 to the vehicle frame 12. The swivel assembly 42 allows the associated rear axle to oscillate about a longitudinally extending horizontal axis, and also permits the rear axle to oscillate about a transverse horizontal axis extending through a spherical connection, to be described hereinafter, between the arm 52 and the steering actuator assembly 40. One further function of the swivel assembly 42 is to allow each rear axle to be steered about a vertical axis which extends through the swivel assembly.

The steering actuator 40 can be seen in detail in FIGS. 3, 9, 10 and 11 and comprises a pair of identically formed transversely extending and parallel rods 64 and 66. Each of the rods 64 and 66 is supported for axial movement by a pair of spaced bushing means 68 and 70 which are respectively fixedly mounted within accommodating bores formed in ears 72 and 74 which radially extend from and are integrally formed with a transversely extending tubular support 76. As best seen in FIG. 11, the tubular support 76, in turn, is secured adjacent its opposite ends to the side rails of the vehicle frame 12.

Each rod 64 and 66 carries stop collars 78 and 80 and sleeve members which serve as confining means for a bearing member 82 having an outer spherical surface 83. The bearing member 82, in turn, carries the arm 52 of the axle housing 50, and in this regard, it will be noted that each arm 52 is formed with a stepped bore 84 which carries a bushing 86 having an inner spherical surface 87 for mating engagement with the spherical surface 83 of bearing member 82. Suitable fastening means are provided for connecting an end ring 88 to the arm 52 for retaining the bushing 86 in the bore 84 and thereby holding the arm 52 in position on the bearing member 82 so as to provide a spherical connection between the arm 52 and the associated rod.

Figure 10:
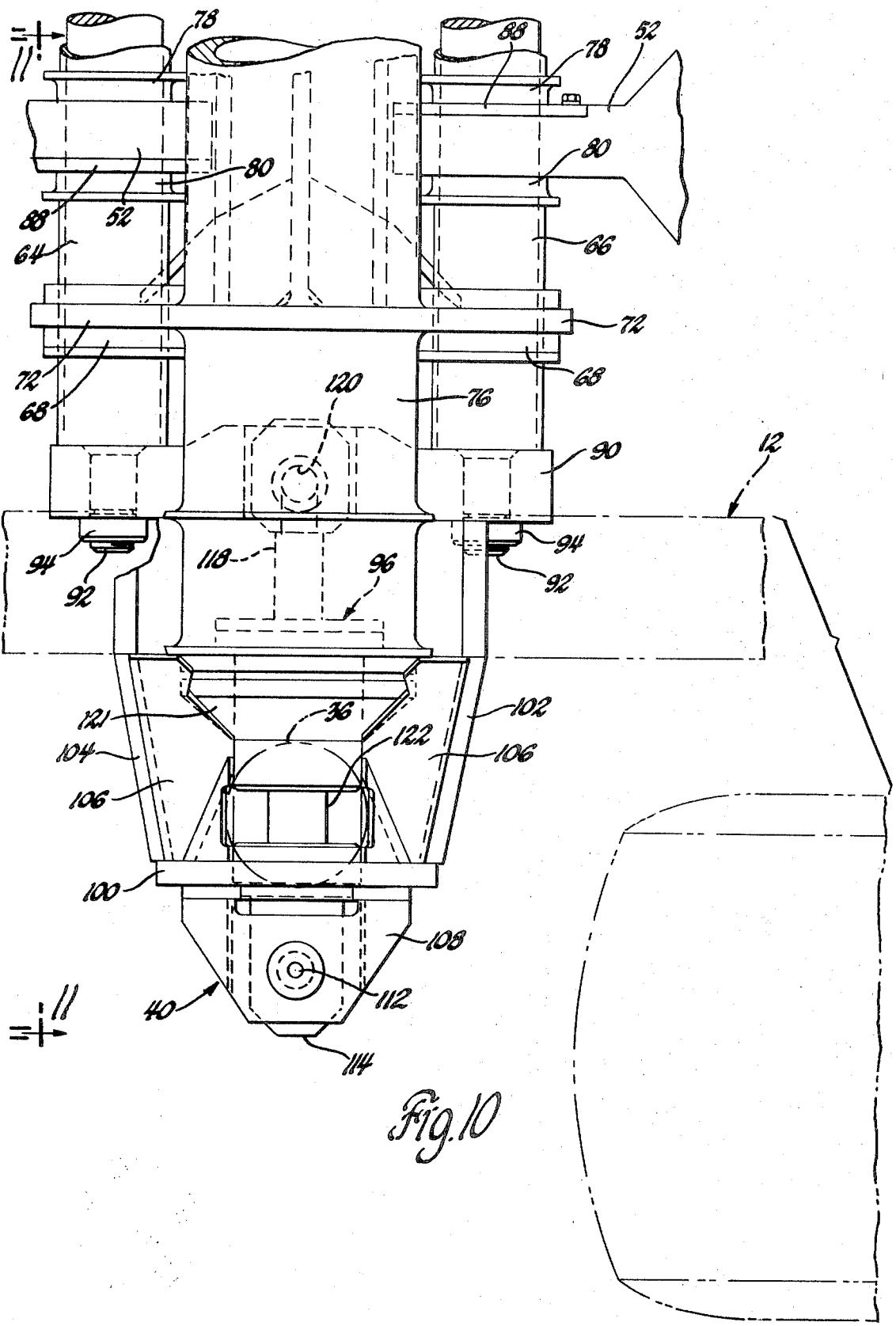
FIG. 10 is a plan view of a portion of the steering actuator taken on lines 10—10 of FIG. 9.

As seen in FIGS. 10 and 11, the adjacent ends of the rods 64 and 66 are interconnected by a cross bar 90 and it will be noted that each end of each rod 64 and 66 is formed with an integral threaded stub member 92 which extends into a suitable aperture formed in the cross bar 90. The cross bar 90 is fastened to the rods 64 and 66 through nuts 94 which are threadably received by the stub members 92. Thus, the rods 64 and 66 are connected together for conjoint movement which is provided by a pair of identical horizontally aligned double-acting hydraulic cylinders 96 and 98 carried by an extension of the frame 12. In this regard, it will be noted that adjacent each end of the tubular support 76, a vertical plate 100 fixed with a pair of side plates 102 and 104 and top plates 106 extends from the side of the frame 12 and forms a box section which is rigid with the frame and projects laterally outwardly therefrom. A pair of brackets 108 and 110 are bolted to the plate 100 and serve to receive a vertical pin 112 which extends through an ear member 114 rigidly formed with the cylinder portion of the associated hydraulic cylinder.

Each hydraulic cylinder 96 and 98 houses the usual piston 116 that is fixed in each instance with a piston rod 118 connected to the cross bar 90 by a pivotal connection 120. A control valve 99 serves to direct pressurized fluid to the hydraulic cylinders 96 and 98. Thus, when the pressurized fluid is directed to the head end of cylinder 96, the fluid also flows to the rod end of cylinder 98, so the pistons 116 of the cylinder will be moved in a leftward direction as seen in FIG. 11 causing the cross bar 90 to move the rods 64 and 66 in a similar direction. On the other hand, by directing pressurized hydraulic fluid to the piston rod end of the hydraulic cylinder 96 and the head end of hydraulic cylinder 98, the pistons 116 thereof as well as the cross bar 90 and the rods 64 and 66 will be moved in a rightwardly direction as seen in FIG. 11. As should be apparent, movement of the rods 64 and 66 in either of the aforementioned directions causes movement of the bearing members 82 and accordingly the arms 52 of the axles 18 and 20 which are connected to the rods as described hereinbefore. In addition, it will be noted the hydraulic cylinders 96 and 98 are adapted to work together for moving the rods 64 and 66 in the appropriate direction for causing steering movement of the axles 18 and 20.

The opposite ends of the tubular support 76 are capped with identical bell-shaped members one of which is seen in FIG. 11 and identified by the numeral 121. The eye formed with the lower end of the body hoist 36 is located between the member 121 and the associated plate 100 for connection with the vehicle frame 12. Thus, as seen in FIG. 11, a horizontal pin 122 extends through plate 100 into the end of the member 121 and provides the pivotal connection 38 for the lower end of the hoist 36. As alluded to, a similar arrangement is provided at the opposite end of the tubular support 76.

The swivel assembly 42 which serves to connect the upper surface of each axle housing 50 to the vehicle frame 12 can be seen in FIGS. 4 through 8. As seen in the latter mentioned Figures, a torque tube stiffener 124, which is a part of frame 12 and is located directly above each swivel assembly, is rigidly formed with a box section consisting of a pair of transversely extending side plates 126 and 128 located in vertically extending parallel planes. The lower edges of the side plates 126 and 128 are rigidly interconnected by bottom plates 130 and 132 and the central portion of the box section is formed with a U-shaped slot. The slot serves as a pocket for accommodating a cushioning device which is generally indicated by the numeral 134 and is carried by the axle housing 50. The slot is defined by transversely spaced vertically orientated and parallel end walls 136 and 138 which merge and are integral with a horizontally disposed top wall 140. It will be understood that the end walls 136 and 138 and the top wall 140 are securely fastened to the side plates 126 and 128 and each end wall is fitted with a wear plate 142 which cooperates with the cushioning device 134 as will be described hereinafter.

Figure 4:
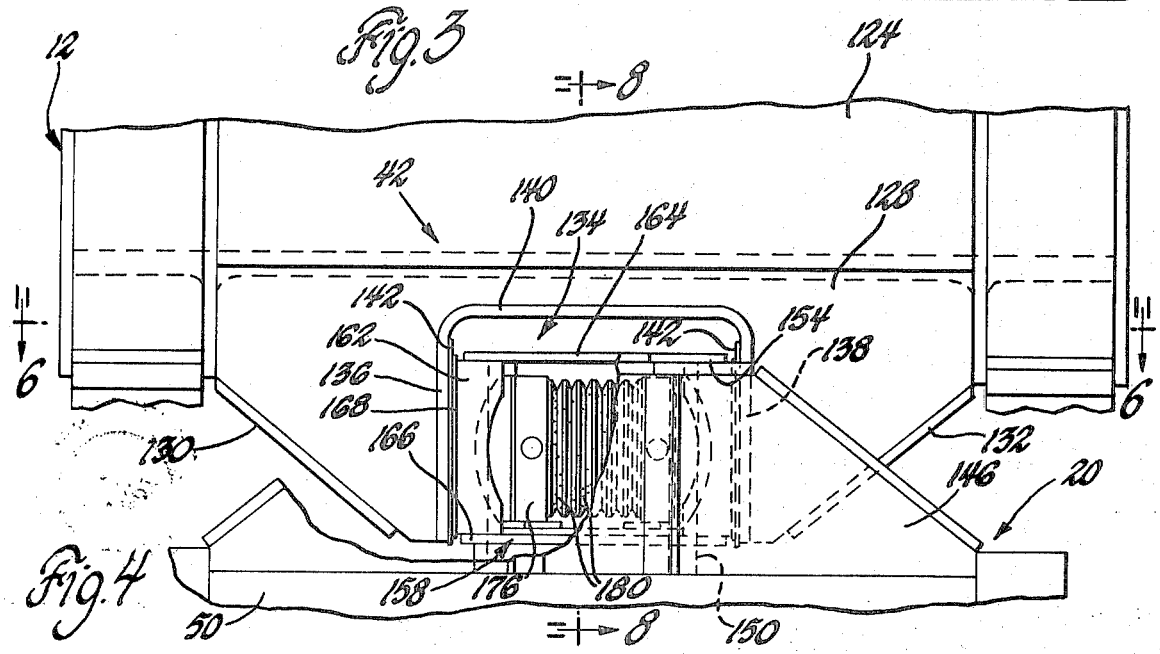
FIG. 4 is an enlarged view of one of the axles taken on lines 4—4 of FIG. 3.

The upper portion of each axle housing 50 is formed with a pair of transversely extending and upstanding walls 144 and 146 which are located in vertical planes that are parallel to each other. A plurality of gusset members 148 serve to rigidly maintain the walls 144 and 146 in position and, as seen in FIGS. 4, 6 and 7, each wall is fixedly provided with a pair of vertically extending bars 150 and 152. The upper ends of the bars 150 and 152 on each wall are interconnected by a strap 154 while the lower ends are secured to a bottom plate 156 so as to form a rectangular well which serves to house a portion of the cushioning device 134 in a manner to be described.

Figure 8:
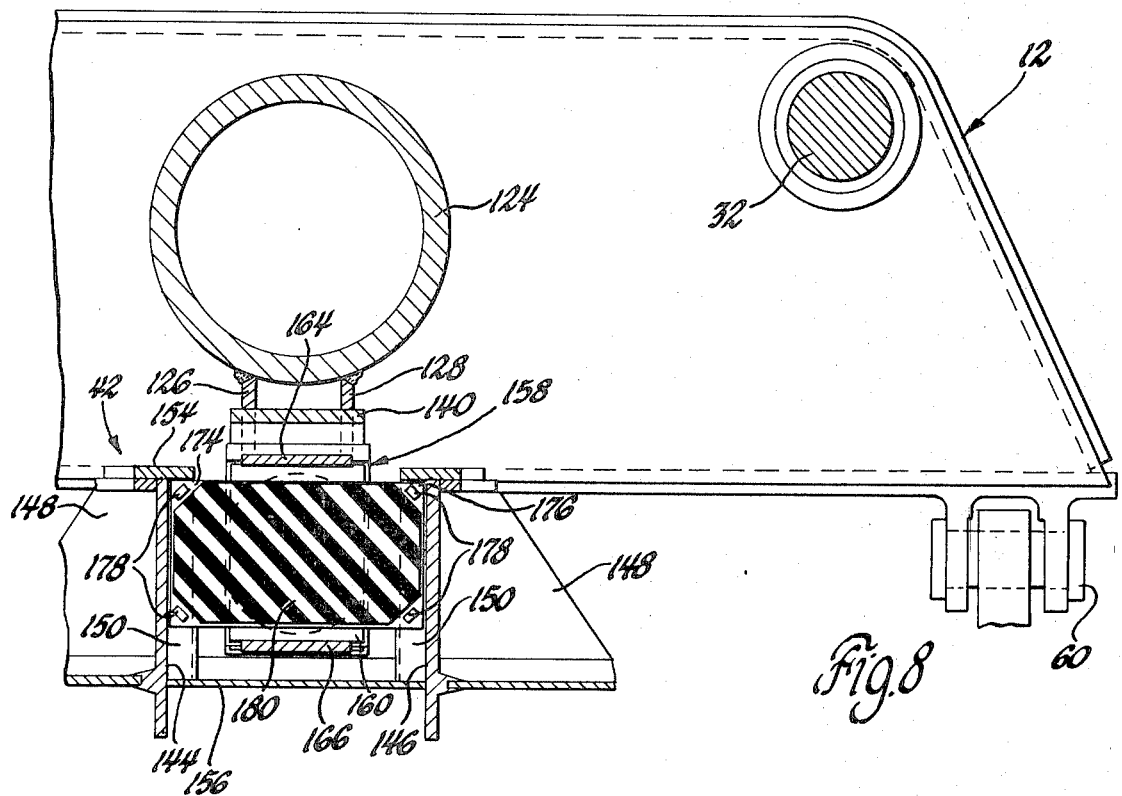
FIG. 8 is a sectional view taken on lines 8—8 of FIG. 4.
Figure 9:
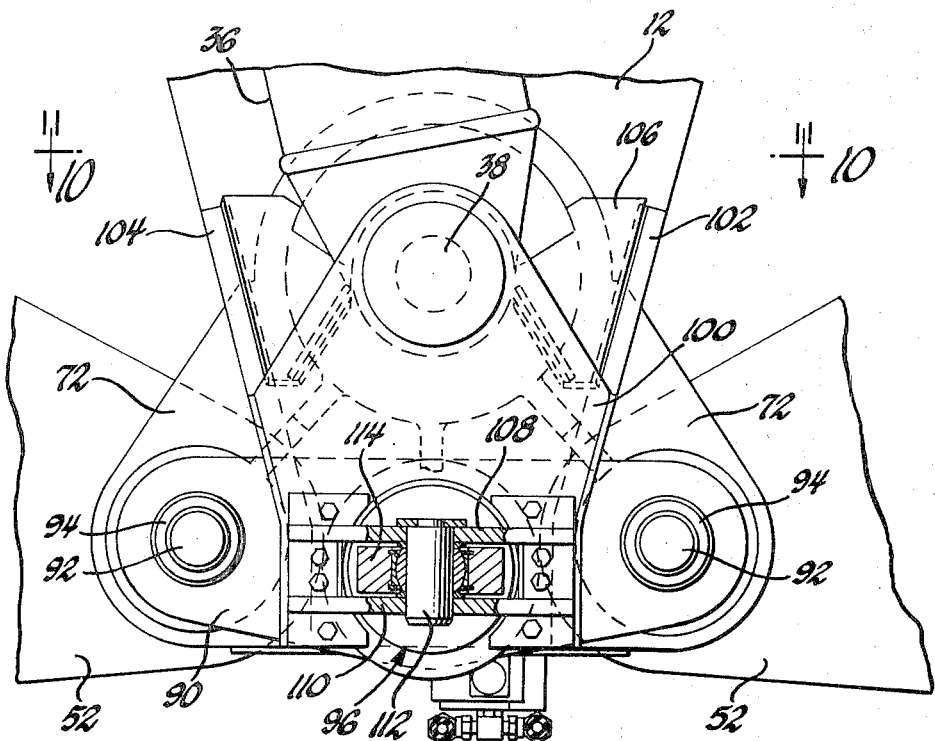
FIG. 9 is an enlarged elevational view taken on lines 9—9 of FIG. 3 showing the steering actuator employed with the tandem axles.

The cushioning device 134 comprises a housing 158 which is defined by a pair of end block members 160 and 162 which are rigidly interconnected by upper and lower plate members 164 and 166 respectively. The end block members 160 and 162 are formed with outer walls each of which rigidly carries a wear plate 168 for surface-to-surface contact with the wear plate 142 mounted within the slot in the frame 12. The inner end of each end block member 160 and 162 is formed with a concave spherical bearing surface 170 which is adapted to serve as a seat for a bearing member 172. The bearing member 172 is formed with a pair of arms 174 and 176 each of which has a pair of tabs 178 projecting outwardly therefrom as seen in FIG. 8. Thus, each bearing member 172 has a portion thereof formed with a convex spherical bearing surface 179 which mates with the bearing surface 170. Located between the bearing members 172 and being retained by the tabs 178 are a plurality of rectangular rubber pads 180 which are preloaded when the cushioning device 134 is assembled so they serve to exert an outward force on each of the bearing members 172 causing the spherical bearing surfaces 179 thereof to maintain engagement with the spherical bearing surfaces 170 formed on the end blocks members 160 and 162.

Figure 3:
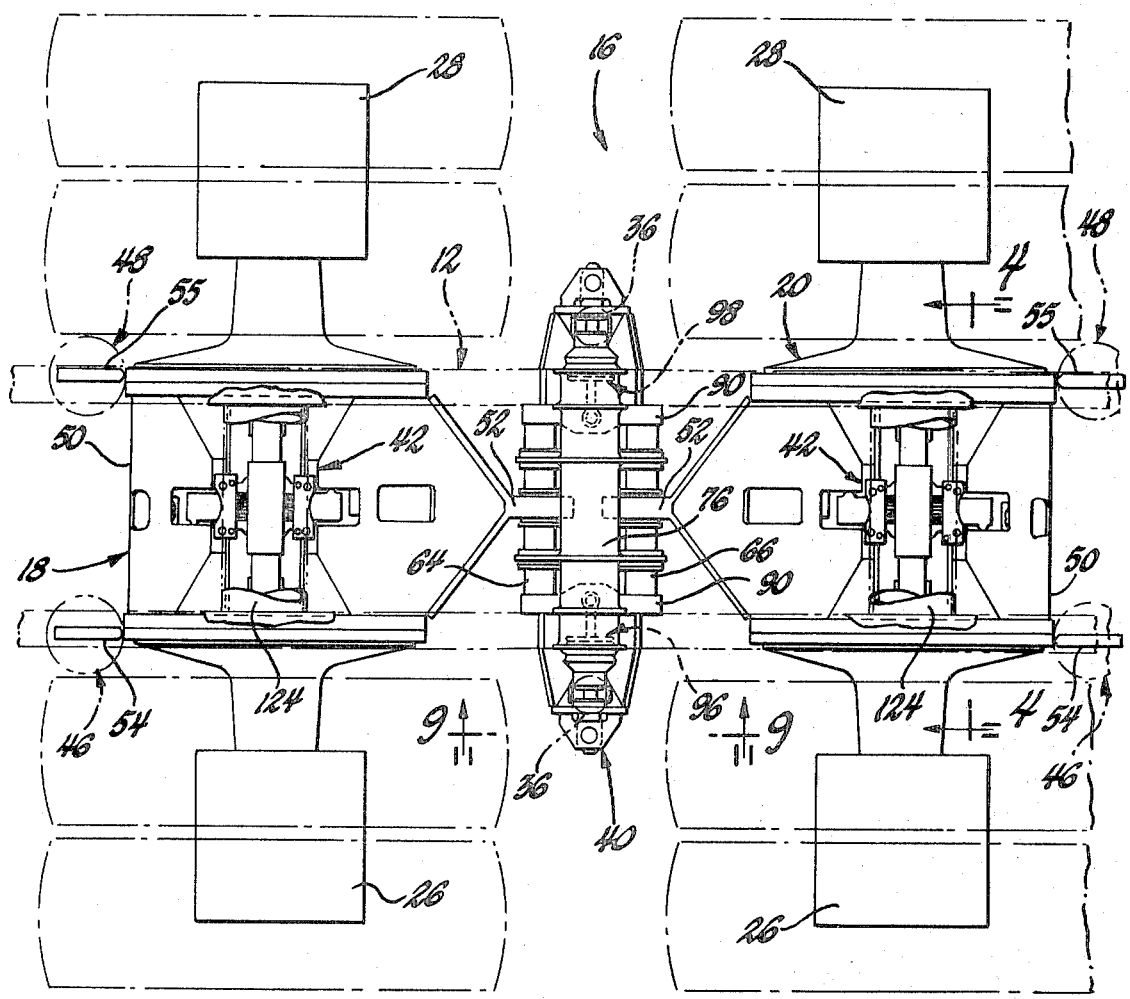
FIG. 3 is a plan view of the steerable tandem axle arrangement of FIG. 2.

As seen in FIGS. 6 and 7, the outwardly extending arms 174 and 176 of each bearing member 172 are received within the wells formed by the vertical bars 160 and 152 and the straps 154 connected with each wall 144 and 146. Thus, from the above description, it should be apparent that the cushioning device 134 is carried by the walls 144 and 146 connected with the axle housing 50. The arrangement is such that oscillation of the axle housing 50 about an axis extending longitudinally of the vehicle will be allowed due to the fact that the bearing members 172 together with the end block members 160 and 162 essentially form a ball and socket type connection which allows the axle to oscillate about the aforesaid axis, as shown in FIG. 5, and also rotate about a vertical axis for steering purposes as shown in FIG. 7. Also as seen in FIGS. 2, 3, and 5, the swivel assemblies 42 allow the axles 18 and 20 to oscillate about transverse horizontal axes passing through the centers of the rods 64 and 66. As should be apparent, such oscillation will be cushioned by the ride cylinders 46 and 48 associated with each axle and during such oscillation the cushioning device 134 will move along an arc vertically up and down along the wear plates 142 and within the accommodating slot described hereinbefore. In addition, it will be noted that lateral forces acting on the vehicle frame will be cushioned by the rubber pads 180 located between the bearing members 172 and can result in one bearing member losing contact with its spherical seat on the associated end block member when a large force indicated by the letter "F" acts on the frame in the direction as seen in FIGS. 5 and 7.

Each swivel assembly 42 also allows the associated axle to move in a fore and aft direction along the longitudinal axis of the vehicle. In this regard and as seen in FIG. 7, it can be seen that the axle assembly 20 and accordingly the cushioning device 134 have shifted in a leftward direction relative to the frame 20 and in a direction towards the steering actuator 40. Such movement will normally occur when the rear axles 18 and 20 are moved to a steered position by the steering actuator 40 as explained hereinbefore. The fore and aft movement must necessarily occur because, during steering of the axles, the arm 52 attached to each axle moves along a straight line represented by the longitudinal axes of the rods 64 and 66 which are normal to the longitudinal axis of the vehicle.

Although not shown, the above described vehicle incorporates a steering control system which upon a predetermined steering movement of the front wheels 14 will serve to direct pressurized fluid to the appropriate ends of the hydraulic cylinders 96 and 98 incorporated with the steering actuator 40 to cause steering movement of the rear axles 18 and 20. The steering control system includes an appropriate actuator, either electric or mechanical, which upon rotation of the front wheels 14 approximately 10° will serve to energize the control valve 99 for directing pressurized fluid to the appropriate ends of the hydraulic cylinders 96 and 98. For example and as seen in FIG. 12, when the front wheels 14 are rotated in a clockwise direction from a phantom-line straight-ahead position to the full-line position, the head end of the hydraulic cylinders 98 and the rod end of the hydraulic cylinder 96 will receive pressurized fluid so as to cause the rods 64 and 66 and the cross bars 90 to be moved towards the hydraulic cylinder 96. Such movement, in turn, causes the spherical connections which join the arms 52 of the axles 18 and 20 to the steering actuator 40 to be moved along parallel and transversely extending axes and cause the axle 20 to be rotated counterclockwise about its swivel assembly 42 and the axle 18 to be rotated clockwise about its swivel assembly. Accordingly, the axles 18 and 20 will be positively steered so as to facilitate the turning movement of the vehicle and thereby prevent scuffing and unnecessary wear of the rear tires. It will be understood that steering movement of the front wheels 14 in a counterclockwise direction as seen in FIG. 12, will result in the hydraulic cylinder 96 being expanded and the hydraulic cylinder 98 being contracted so that the cross members 90 and the rods 64 and 66 will be shifted towards the cylinder 98. Such movement will cause the axle 18 to be rotated counterclockwise about its swivel assembly 42 while axle 20 will be rotated clockwise about its swivel assembly.

It is intended that the degree of steerability provided for each axle 18 and 20 of the vehicle 10 be between 7 and 10 degrees. It should be apparent, however, that the amount of steerability allowed for each axle will be determined by the distance between the axes of wheel rotation of both axles 18 and 20 and the size of the various parts thereof and can be increased or decreased depending on design requirements. As aforementioned, movement of the rods 64 and 66 during a steering operation causes each of the axles 18 and 20 to pivot about a vertical axis passing through the associated swivel assembly 42. In addition, inasmuch as the spherical connection at the arm 52 moves along a straight line, each swivel assembly 42 allows the associated axle to move towards the steering actuator 40 during the steering maneuver.

Various changes and modifications can be made in this construction without departing from the spirit of the invention. Such changes and modifications are contemplated by the inventors and they do not wish to be limited except by the scope of the appended claims.

We claim:

1. A swivel assembly for connecting a transverse axle member to a vehicle frame member and adapted to be located in an opening formed in one of said members to allow said axle member to be steerable about a vertical steer axis and to oscillate relative to the vehicle frame member, said opening being defined by a pair of laterally spaced and parallel end walls located in vertical planes which extend longitudinally of the vehicle frame member, said swivel assembly being carried by the other of said members and comprising a housing located between said end walls, said housing including a pair of laterally spaced and rigidly interconnected end block members, said end block members having outer walls in surface-to-surface contact with said end walls and allowing said housing together with the axle member to move in a vertical direction and in a horizontal direction relative to the end walls, a spherical bearing surface formed in each of said end block members and means connected with said other of said members and supported between the spherical bearing surfaces of the block members for universal movement so as to allow said axle member to rotate about said vertical steer axis and oscillate relative to said vehicle frame member.

2. A swivel assembly for connecting a transverse axle member to a vehicle frame member and adapted to be located in an opening formed in one of said members to allow said axle member to be steerable about a vertical steer axis and to oscillate relative to the vehicle frame member, said opening being defined by a pair of laterally spaced and parallel end walls located in vertical planes which extend longitudinally of the vehicle frame member, said swivel assembly being carried by the other of said members and comprising a cushioning device located between said end walls, said cushioning device including a housing having a pair of laterally spaced and rigidly interconnected end block members, said end block members having outer walls in surface-to-surface contact with said end walls and allowing said housing together with the axle member to move in a vertical direction and a horizontal direction relative to the end walls, each of said end block members having a spherical bearing surface formed therein, a bearing member connected with said other of said members and universally pivotally supported by each of said bearing surfaces, and spring means located between the bearing members for urging each bearing member into engagement with the bearing surface on the associated end block member and serving to absorb side loading on the vehicle frame member.

3. A swivel assembly for connecting a transverse axle to a vehicle frame and adapted to be located in an opening formed in said vehicle frame to allow said axle to be steerable about a vertical steer axis and to oscillate relative to the vehicle frame member, said opening being defined by a pair of laterally spaced and parallel end walls located in vertical planes which extend longitudinally of the vehicle frame, said swivel assembly comprising a cushioning device located between said end walls, said cushioning device including a housing having a pair of laterally spaced and rigidly interconnected end block members, said end block members having outer walls in surface-to-surface contact with said end walls and allowing said housing together with the axle to move in a vertical direction and a horizontal direction relative to the side walls, a spherical bearing surface formed in each of said end block members, means carried by the axle and universally supported by each of said bearing surfaces for permitting the axle to rotate about the vertical steer axis and oscillate relative to the vehicle frame member and spring means located between the bearing members for urging each bearing member into engagement with the bearing surface on the associated end block member and serving to absorb side loading on the frame.

4. In combination with a vehicle having a frame provided with dirigible wheels at the front end thereof and steerable tandem axles at the rear end of the frame, a swivel assembly for connecting each of said axles to the frame and adapted to be located in a U-shaped slot formed in said frame to allow said each of said axles to be steerable about a vertical steer axis and to oscillate relative to the frame, said slot being defined by a pair of laterally spaced and parallel end walls located in vertical planes which extend longitudinally of the vehicle frame, said swivel assembly being carried by said each of said axles and comprising a cushioning device located between said end walls, said cushioning device including a housing having a pair of laterally spaced end block members rigidly interconnected by upper and lower plate members, said end block members having flat outer walls in surface-to-surface contact with said end walls and allowing said housing together with said each of said axles to move in a vertical direction and in a horizontal direction relative to the side walls, each of said end block members having a concave spherical bearing surface formed therein, a bearing member with a convex spherical bearing surface supported by each of said bearing surfaces, a pair of outwardly extending arms formed with each bearing member and connected to said each of said axles, and a plurality of resilient pad members located between the bearing members for urging the convex spherical bearing surface of each bearing member into engagement with the concave bearing surface on the associated end block member and serving to absorb side loading on the frame.

* * * * *